US008250355B2

(12) United States Patent
Eilam et al.

(10) Patent No.: US 8,250,355 B2
(45) Date of Patent: Aug. 21, 2012

(54) METHOD, SYSTEM, AND PRODUCT FOR IDENTIFYING PROVISIONING OPERATIONS VIA PLANNING METHODS

(75) Inventors: Tamar Eilam, New York, NY (US); Michael Husayn Kalantar, Millwood, NY (US); Alexander Konstantinou, New York, NY (US); Kaoutar El Maghraoui, Troy, NY (US); Alok Menghrajani, Lausanne (CH); Lily Barkovic Mummert, Mahopac, NY (US); John Arthur Pershing, Jr., Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 12/131,238

(22) Filed: Jun. 2, 2008

(65) Prior Publication Data

US 2008/0235506 A1 Sep. 25, 2008

Related U.S. Application Data

(63) Continuation of application No. 11/133,541, filed on May 20, 2005, now abandoned.

(51) Int. Cl.
*G06F 1/24* (2006.01)
*G06F 9/00* (2006.01)
(52) U.S. Cl. ...................................................... 713/100
(58) Field of Classification Search .................... 713/100
See application file for complete search history.

(56) References Cited

U.S. PATENT DOCUMENTS 7,249,174 B2   7/2007 Srinivasa et al.
7,500,112 B1 *  3/2009 Wille et al. .................... 713/194
2002/0184484 A1  12/2002 Abboud et al.
2003/0101057 A1 *  5/2003 Torge et al. ................ 704/270.1
2006/0236061 A1  10/2006 Koclanes

OTHER PUBLICATIONS

Altiris Inc. "Automated Server Provisioning Benefits and Practices" White Paper. Aug. 2004. (14 Pages) http://hosteddocs.ittoolbox.com/altiris010306b.pdf.
Nguyen, et al. "Reviving Partial Order Planning" In IJCAI. Proceedings of the Seventeenth International Joint Conference on Artificial Intelligence. Aug. 2001. pp. 459-466. http://rakaposhi.eas.asu.edu/ucpop-revive.pdf.
Weld. "Recent Advances in AI Planning" American Association for Artificial Intelligence. AI Magazine vol. 20. No. 2. Summer 1999. pp. 93-123. http://www.cim.mcgill.ca/~yon/ai/papers/AIMag20-02-008.pdf.
Weld. "An Introduction to Least Commitment Planning" American Association for Artificial Intelligence. AI Magazine vol. 15. No. 4. Winter 1994. pp. 27-63. http://www.aaai.org/ojs/index.php/aimagazine/article/view/1109/1027.
U.S. Appl. No. 10/776,297, filed Feb. 11, 2004, Unpublished IBM Appl Filing.

(Continued)

*Primary Examiner* — Mohammed Rehman
(74) *Attorney, Agent, or Firm* — Tutunjian & Bitetto, P.C.; Preston J. Young, Esq.

(57) ABSTRACT

A method, system, and computer program product are disclosed for automatically determining a valid ordering of provisioning operations, and their needed parameters, so that a provisioning system can configure a desired resource state. This is accomplished by formally describing the pre-conditions and effects of provisioning operations, the current state of managed resources and the desired final state. A planning algorithm is then used to determine the provisioning operations, a valid ordering and appropriate parameters to bring the system from the current state to the desired state.

30 Claims, 9 Drawing Sheets

OTHER PUBLICATIONS

U.S. Appl. No. 10/776,705, filed Feb. 11, 2004, Unpublished IBM Appl Filing.
U.S. Appl. No. 10/789,123, filed Feb. 27, 2004, Unpublished IBM Appl Filing.
U.S. Appl. No. 10/789,147, filed Feb. 27, 2004, Unpublished IBM Appl Filing.
T. Eilam et al, "Reducing the Complexity of Application Deployment in Large Data Centers", IBM TJ Watson Research Center, 14 pages.
A. Menghrajani et al, "Provisioning with Partial Order Planning" Master in Computer Science at the Ecole Polytechnique Federate de Lausanne, Feb. 18, 2005; pp. 1-68.
Daniel S. Weld, "An Introduction to Least Commitment Planning", 1994, AI Magazine, 15(4) pp. 27-61.
Naresh C. Gupta et al, "On the Complexity of Blocks-World Planning", Aug. 1992, Artificial Intelligence, 56(2-3): pp. 1-28.

* cited by examiner

METHOD, SYSTEM, AND PRODUCT FOR IDENTIFYING PROVISIONING OPERATIONS VIA PLANNING METHODS

RELATED APPLICATION INFORMATION

This application is a Continuation application of co-pending U.S. patent application Ser. No. 11/133,541 filed May 20, 2005 now abandoned, incorporated herein by reference in its entirety.

BACKGROUND

1. Technical Field

The present invention relates generally to resource provisioning systems, and in particular to a method, system, and product for automatically determining a valid ordering of provisioning operations implemented by such systems to reach a desired resource configuration state through the use of planning methods.

2. Description of the Related Art

Resource provisioning systems, or provisioning systems, enable the configuration of a set of interconnected computing resources. Such resources, or managed resources, include, for example, servers, firewalls, and software. A provisioning system makes available a set of provisioning operations that will automate some configuration tasks performed on the set of managed resources. For example, a provisioning operation may assign a port on a network switch (often called a switch port) to a particular virtual local area network (VLAN).

This configuration operation is one in a sequence of configuration operations that needs to be invoked to connect a server to a VLAN. Provisioning systems maintain a configuration repository including information about the set of managed resources and their current configuration state. Provisioning operations change the content of the configuration repository to reflect the new state of managed resources resulting from its execution.

Provisioning operations are defined to carry out one or more specific configuration tasks. The number of configuration tasks and the number of affected resources can vary widely between provisioning operations. A provisioning operation can be very specific, for example, define a new VLAN on a single network switch resource from a particular type, say, CISCO™ 6500 series switch. On the other hand, a provisioning operation may carry out many configuration tasks and affect a large set of resources, for example, define a VLAN on a set of interconnected network switches of different types and perform related tasks such as configure VLAN routing.

To deploy a new service or a distributed application, or to perform any other configuration activity, such as applying a security patch update, a user must manually invoke a long sequence of configuration operations from a graphical user interface (GUI) or command line interface (CLI). Alternatively, some provisioning systems allow the user to define a sequence of provisioning operations, and then trigger their automatic execution. Such definition of sequences of provisioning operations is sometimes called provisioning workflow.

Common configuration activities in large data centers where a provisioning system is used may include hundreds of configuration operations that install and configure various software, hardware and network elements. The order of provisioning operations in the provisioning workflow is important as the wrong order can lead to a situation where connectivity with managed resources is lost and the entire execution of the workflow fails to complete. Preconditions for each and effects of each provisioning operation must be well understood and taken into account when defining a provisioning workflow.

Therefore, the definition of a workflow to realize configuration activities is today a manual, slow and error prone process. It is a key problem for users of provisioning systems to determine which provisioning operations should be invoked, in what order, and with what parameters in order to bring the system from the current state to its desired state.

SUMMARY

A need exists for a method, system, and computer program product that can automatically generate a valid order of provisioning operations and parameters to bring the system from its current configuration state to the desired configuration state.

The current state of the art does not describe how to take into account existing provisioning operations proposed by an existing provisioning system to generate workflow that can then be automatically executed using the provisioning system.

A method to automate provisioning based on a specification of a desired configuration state is not described in the prior art without mapping effects of the provisioning operations to single entities (objects and relationships) in the desired state. It is not described how to automate provisioning using an existing provisioning system that may not make available provisioning operations that obey this mapping to single entities.

A system, method, program products for ordering operations to achieve a desired state of the resources managed by the provisioning system, includes identifying provisioning operations for a provisioning system and defining preconditions and effects of the provisioning operations. A state of resources managed by the provisioning system is defined, and a planning algorithm is applied.

A system, method and program product for determining a set of provisioning operations and a valid order for their execution in a provisioning system includes storing configuration criteria and a mapping function in a configuration mechanism and mapping content from a configuration repository into a form suitable for a planning algorithm by employing the mapping function. A workflow is determined by employing the planning algorithm which receives as input an initial state and a goal state and plans a set of operations to achieve the goal state in accordance with the configuration criteria.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
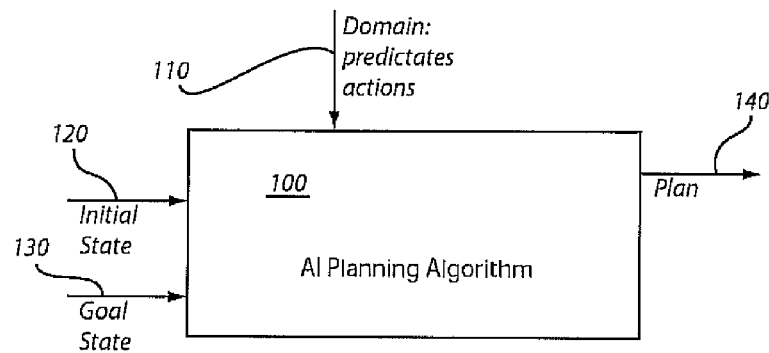
FIG. 1 is a block diagram showing a general structure for artificial intelligence planning algorithms.

A method, system, and computer program product in a data processing system are disclosed for applying artificial intelligence (AI) planning techniques to automatically determine a valid ordering of provisioning operations provided by a provisioning system to bring a system from its current state to a desired state.

Provisioning systems provide a number of provisioning operations used to configure the resources that the provisioning systems manage. Once these operations have been identified, they can be formally modeled as planning actions. Each planning action is associated with preconditions and effects. Optionally, cost information can be associated with each action. Costs may include multiple dimensions such as a resource cost or the time to execute.

Similarly, the resources being managed by the provisioning system and their configuration can be formally described as an initial state of the system in a language understood by an AI planning algorithm.

Further, a desired configuration state of the resources can also be formally described in a language understood by an AI planning algorithm. Given these inputs, an AI planning algorithm can be used to determine what provisioning operations are needed, an order in which the operations should be executed and their input parameters. If optional cost information is provided, it can be used to select an optimal set and order.

It should be understood that the elements shown in the FIGS. may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Embodiments of the present invention provide systems and methods that can be used by a computer system to identify a set of provisioning operations in a given provisioning system, and a valid order in which to execute the operations to configure a set of managed resources to reach a system configuration desired state specified by the user. The set of provisioning operations and the ordering information may be referred to as provisioning workflow.

Embodiments described herein may apply known AI planning techniques to automatically generate the provisioning workflow. The characteristics of AI planning algorithms, and their inputs, and outputs will be described. AI planning and how it can be applied to automatically generate provisioning workflows for an existing provisioning system will be described.

AI Planning

Referring now to the drawings in which like numerals represent the same or similar elements and initially to FIG. 1, an AI planning algorithm 100 uses propositional logic to describe an initial state 120, a goal state 130 and a set of actions 110. Every action 110 is associated with preconditions and effects. A planner domain or plan 110 defines a set of predicates, where every predicate can take a number of parameters. The initial state 120, and goal state 130, are expressed as a set of literals where every literal is a predicate with parameters bound to specific values (terms).

For example, in the well-known blocks world problem: (onTable A) (onTable B) (onBlock C A) (clear B) (clear C) describe an initial state. A, B, and C are the set of terms. The set of predicates are: on Table, onBlock and, clear. Every expression in parenthesis is a literal equal to TRUE in the initial state. A goal state can be similarly described as (onBlock B A) (onBlock C B). Actions can be described using propositional logic as well.

In the blocks world problem, there are two actions: placeBlock(X, Y) and removeBlock (X, Y). Every action is associated with preconditions and effects. An action can be executed only after its preconditions are met. Once an action is executed, the effects represent literals whose values equal TRUE when evaluated on the resulting state. The preconditions of the action placeBlock(X,Y) are: clear(X), onTable (X) clear(Y). The effects are: not clear(Y), onBlock(X, Y), not onTable(X).

To use a planning algorithm 100 one needs to define the domain 110 including: predicates, actions, and their preconditions and effects. Once the domain 110 is defined the planner 100 can be used to produce a sequence of instantiated actions to reach a goal state 130 from a given input state. Every instantiated action is an action whose parameters are bound to specific values (terms).

For example, in the blocks world problem, with the initial state 120 and goal state 130, as described above, a possible output 140 of the planner algorithm 100 is the following sequence of actions: removeBlock(C,A), placeBlock(B,A), placeblock(C,B). When executed in order starting from the initial state 120, the goal state 130 will be reached.

Provisioning Systems

Figure 2:
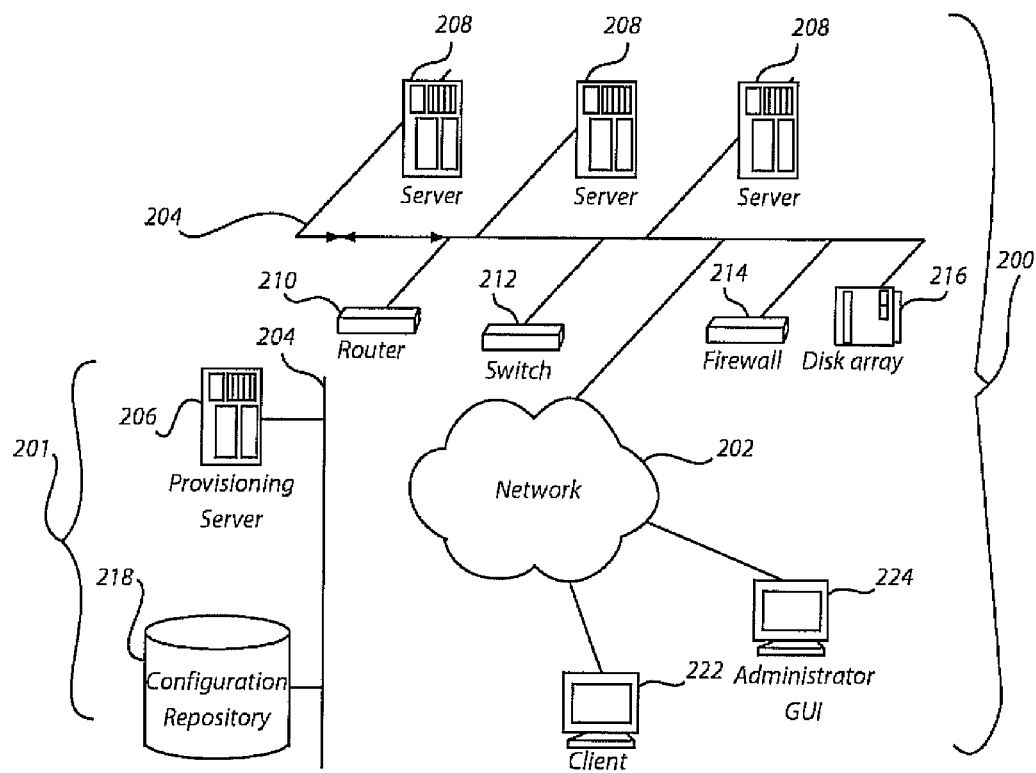
FIG. 2 is a schematic block diagram that shows a structure of a resource environment controlled by a provisioning system.

Referring to FIG. 2, a resource environment 200 for provisioning systems is illustratively shown. A provisioning system 201 is connected via a network 202 to a set of managed resources 204, e.g., servers 208, router 210, switch 212, firewall 214 and disk array 216. A configuration repository 218 is coupled to a provisioning server 206 and includes information on the managed resources 204 and their current configuration. The provisioning system 206 provides a fixed set of provisioning operations to configure resources. These operations, as well as the content of the configuration repository 218 may be presented to a user client 222 or administrator 224 via a graphical user interface (GUI). The user may select a single operation for execution with appropriate parameter values. The user may also manually define a sequence of operations to execute in order. Such sequences of operations are sometimes termed provisioning workflow.

Provisioning systems 201 are commonly used to deploy new services in data centers and to perform needed changes, e.g., to apply a security patch on a set of machines. A provisioning workflow to deploy a new service may include hundreds of operations, including installation and configuration of various software and network elements on multiple machines. The order of execution is one important aspect; wrong order can lead to a situation in which the provisioning system loses connectivity with some managed resources causing the entire workflow to fail. Provisioning workflows are typically written manually, and the process takes time and is error-prone.

The present invention provides a method to apply AI planning techniques to existing provisioning systems in order to automate the process of generating workflows.

Applying AI Planning to Automatically Generate Provisioning Workflows

Figure 3:
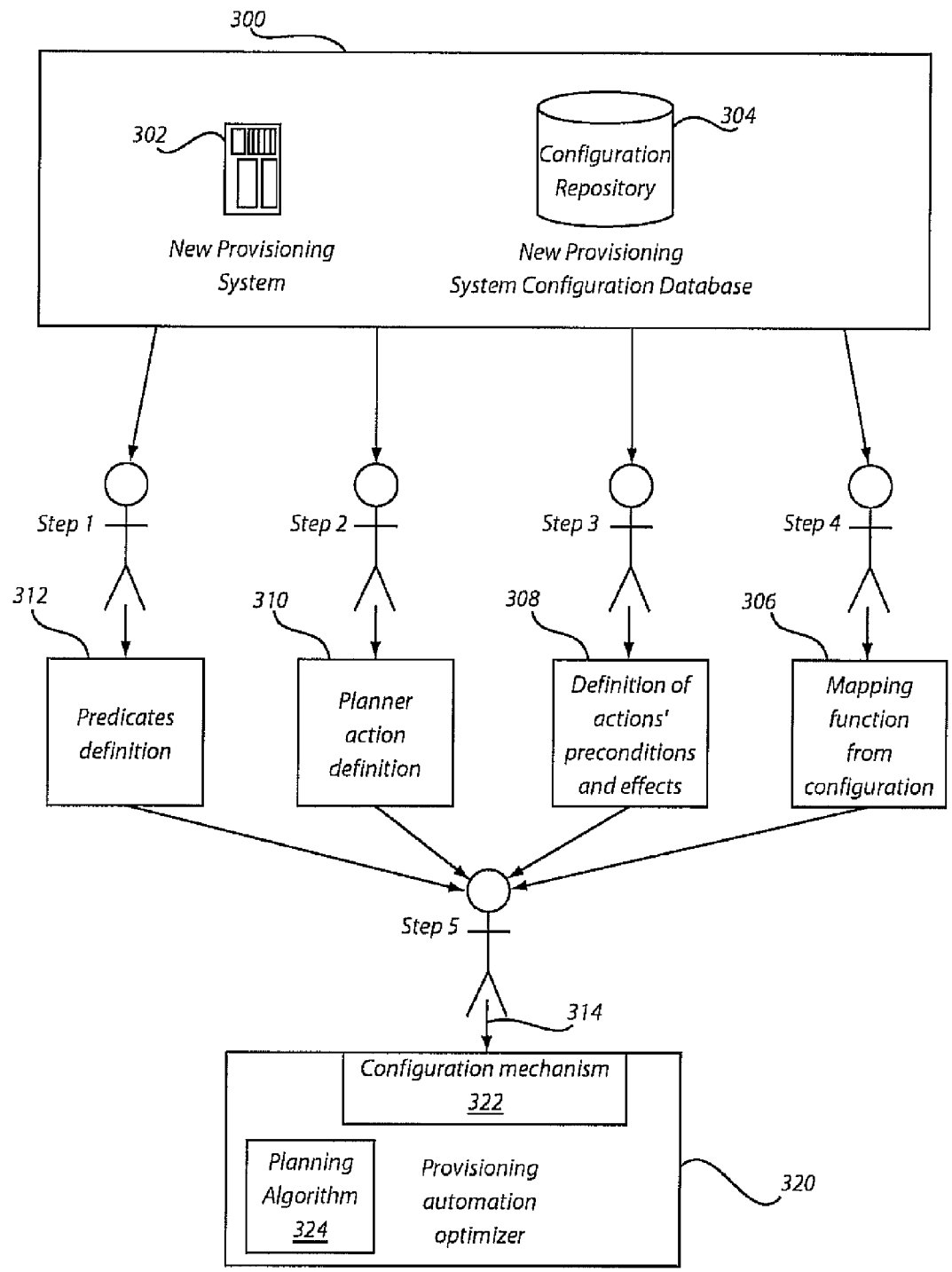
FIG. 3 is a block/flow diagram that illustratively shows steps to set up a provisioning optimizer system to generate workflows for a particular pre-existing provisioning system.

Referring to FIG. 3, a system/method is illustratively shown for a setting phase of a provisioning automation optimizer 320 in accordance with one embodiment of the present invention. One of the main components of the optimizer 320 is a planning algorithm 324. An example of a class of planning algorithms that can be used is least commitment planning. AI planning algorithms use a language, based on propositional logic, to describe the domain (predicates and actions), and the initial and goal domain states. The language understood by the planning algorithm will be referred to as planner modeling language.

To use the optimizer 320 to automatically generate workflow for a given provisioning system 300, a one-time setup needs to be performed.

In the setup phase, every operation exposed by the provisioning system 300 (including a provisioning server 302) is mapped to a planner action in block 310. A set of predicates is defined in block 312 that can be used to describe the managed resources' configuration state as well as the preconditions and effects of every planner action in block 308. In addition, a mapping function 306 is defined to automatically transform the content of a configuration repository 304 to a domain state expressed over the set of predicates shown in block 312. Once the optimizer 320 is set to use the aforementioned components, the optimizer 320 can be used to automatically generate provisioning workflows for given initial and goal states.

Hereafter, the steps needed in the setup phase will be described in greater detail, as well as the method used by the optimizer 320 to automatically generate workflows once the setup phase is complete.

The first step is to define a set of planner domain predicates in block 312. The provisioning system's 300 configuration repository 304 preferably uses a modeling schema (also termed a meta model) to describe a configuration state of the managed resources. In many cases, the schema used is an object-relationship schema. That is, it defines a set of object types and relationships between them. In this case, to define the needed set of predicates, every relationship between two resource types is mapped to a binary predicate with a unique name. For example, if the object-relationship schema defines a relationship of type "contains" between an object of type "server" (representing a server resource) and an object of type "NIC" (representing a network interface card resource), then a binary predicate contains_server_nic(X,Y) will be defined where X should be bound to an identity of the server, and Y to an identity of the network interface card (NIC). In case the object relationship schema also includes attributes on objects, it can be easily converted to an equivalent schema that represents each attribute as an object with a relationship to the original object.

For example, if an attribute managedIPAddress is defined on an object of type server, the object will be converted to a relationship managedIPadress_server_IP(X,Y), where X takes an identity of a server and Y an identity of an associated IP address. Other methods may be defined and used to map an object relationship schema to a set of predicates with similar expressive power. In case the schema that is used by the configuration repository 304 is not an object relationship schema (for example, it may be a relational schema), the relationship can be mapped first to an object relationship schema and then to the needed set of predicates as described above. It should be clear to anyone who is familiar with the art how to convert schemas used to represent system configuration state to an object relationship schema with equivalent expressive power.

The second step of the setup phase is to map the provisioning operations provided by the provisioning system 300 to planner actions in block 310. The mapping may be trivial: every provisioning operation is mapped to an action with the same name and the same number of parameters. For example, if the provisioning system exposes a provisioning operation moveSPtoVLAN(SP, oldVLAN, newVLAN) that moves a switch port SP from a particular virtual local area network (VLAN) oldVLAN to a new VLAN newVLAN then a similar planning action moveSPtoVLAN(X,Y,Z) will be defined.

The third step in the setup phase is to define, for every planner action, the preconditions and effects in block 308. It should be possible to describe the preconditions and effects of every planner action using the set of predicates defined in block 312 of the setup phase. For example, for the moveSPtoVLAN(X,Y, Z) action the preconditions may be defined as: exists_VLAN(Z), contains_SP_DVLAN(X, Y). These preconditions assert that indeed the new VLAN newVLAN is defined on the managed set of switches, and that indeed the switch port SP is included in the VLAN oldVLAN. The effects of the moveSPtoVLAN(X,Y,Z) action may be defined as: contains_SP_VLAN(X, Z), not contains_SP_VLAN(X, Y).

The forth step in the setup phase is to provide a mapping function 306 that automatically reads the content of the configuration repository 304 and transforms the content to a set of literals, defined over the predicates provided in block 312. The mapping function 306 can be coded using any programming language. The logic to perform the needed transformation is similar to the principles used in the first step (block 312). For example, if the configuration repository schema is an object-relationship, then any relationship between two objects is mapped to a corresponding predicate whose parameters are bound to the identity of the objects at the endpoints.

It is to be understood the first through fourth steps as described above may be performed in different orders and are referred to as first through fifth steps for ease of reference.

Figure 4:
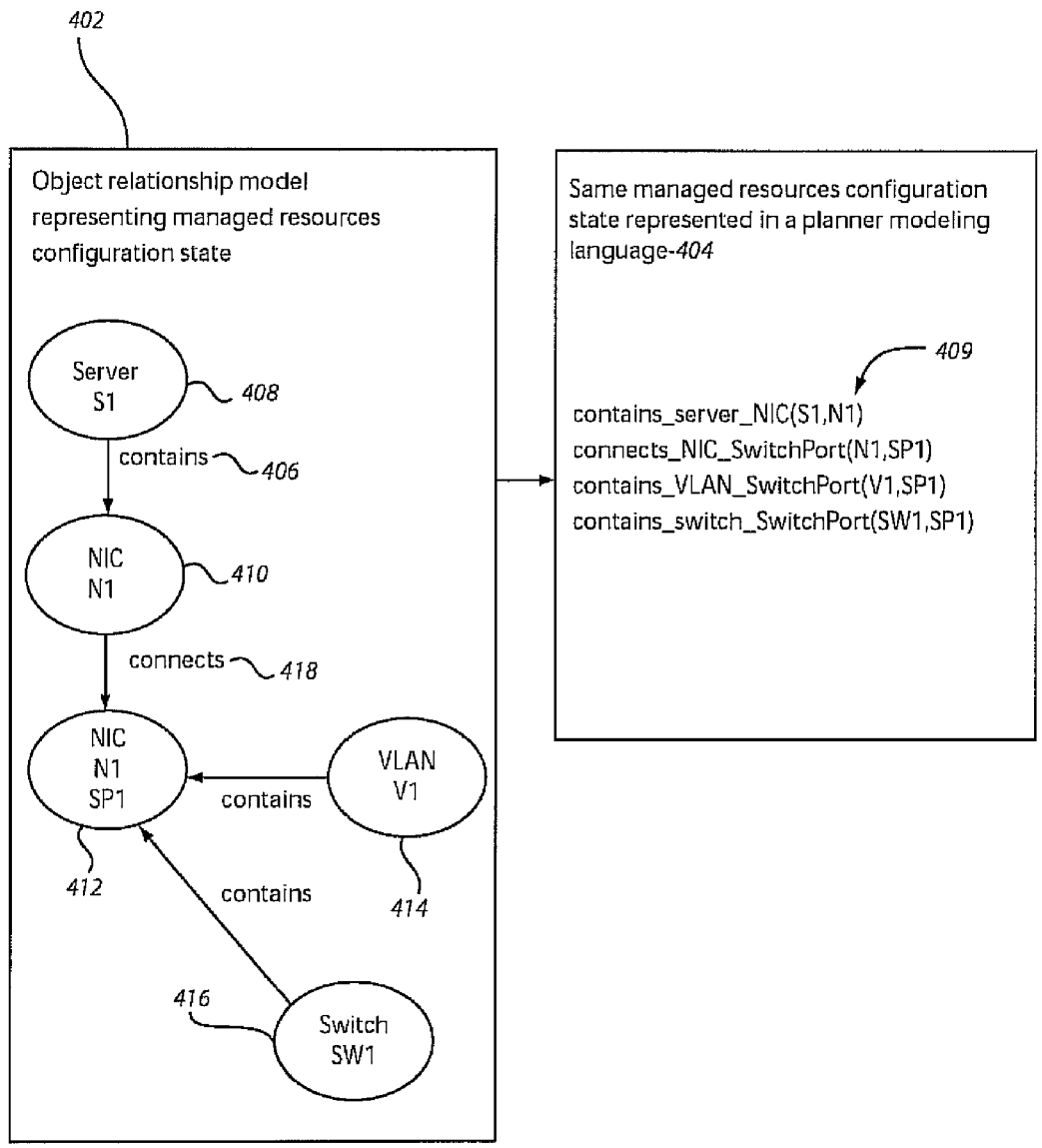
FIG. 4 is an illustration showing mapping of an exemplary object relationship model representing managed resource configuration states to an equivalent representation using a planner modeling language.

Referring to FIG. 4, an example of how an object relationship model 402 representing a configuration state of a set of managed resources can be translated to a set of literals expressed in a planner modeling language is illustratively shown. Note that the set of managed resources includes a server 408, a NIC 410, a switch port 412, a VLAN 414 and a switch 416. The configuration of the resources is described using binary relationships. For example, the fact that a NIC 410 is physically wired to a switch port 412 is expressed using the "connects" relationship 418 between the corresponding objects. As described above, the representation is translated to a planner modeling language in block 404 by using a predicate for every relationship type. For example, a "contains" relationship 406 between a resource of type server 408 and a resource of type NIC 410 is transformed to a predicate contains_server_NIC.

Every relationship instance is transformed to a literal, that is, the corresponding predicate with its parameters bound to the identities of the relationship endpoints. For example, the relationship 406 is transformed to the literal 409.

Configuration repositories (304) provide Application Programming Interface(s) (API) that permit a computer program to read their content. It should be understood to one skilled in the art that a computer program that provides automatic transformation from the configuration repository representation of the managed resources configuration state to an equivalent representation using the planner modeling language is attainable using the principles described above.

Referring again to FIG. 3, a fifth step in the setup phase is to configure the optimizer 322 to work with the artifacts described above: the definition of predicates (312), actions (310), and their preconditions and effects (308), and the mapping function (306) from the content of the configuration repository 304 to a domain state. Such a configuration mechanism 322 may take many forms. For example, the planner domain (predicates, actions, and their preconditions and effects) can be defined using XML and kept as an XML file or multiple XML files in the file system. The fifth step in the setup may include specifying the path to the files. The program that implements the mapping function may be packaged appropriately, for example as a JAVA™ archive file. This step specifies any necessary system configuration to execute the mapping function.

Once the setup phase is complete the optimizer 320 can be used to automatically generate provisioning workflows that can be executed using the provisioning system.

Following is a description of the optimizer components followed by a description of an illustrative process to generate provisioning workflows.

Figure 5:
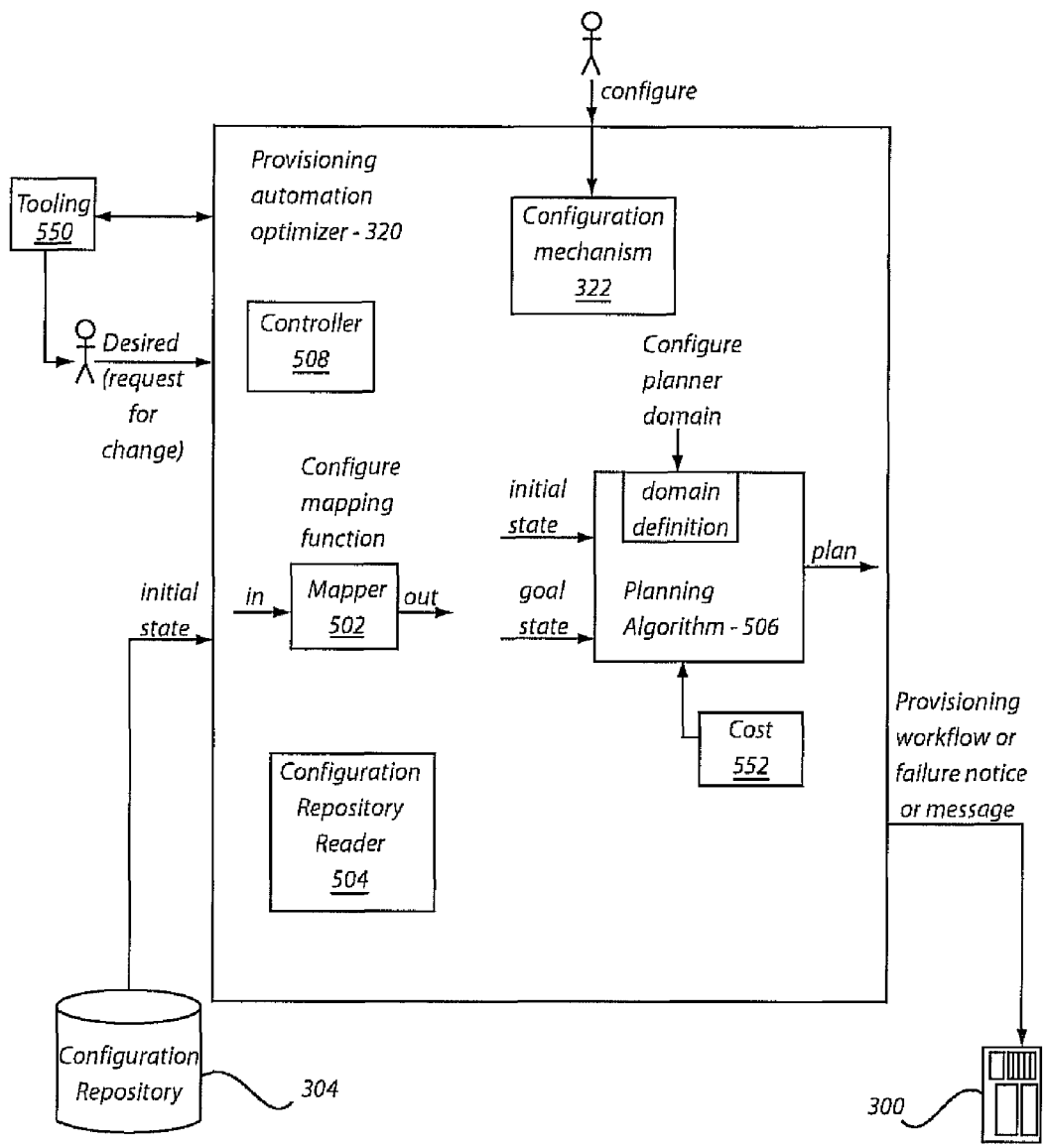
FIG. 5 is a block diagram showing an illustrative provisioning optimizer system in accordance with one embodiment.

Referring to FIG. 5, components of an optimizer 320 are illustratively shown in accordance with one embodiment. A configuration mechanism 322 used in the setup phase to incorporate the planner domain (predicates, actions and their preconditions and effects), and a mapping function is provided (e.g., in blocks 306, 308, 310, and 312 of the setup phase (FIG. 3).

A mapper 502 receives as input a model that adheres to the configuration repository schema of a provisioning system and provides as output an equivalent representation using the planner modeling language. The mapper 502 uses the mapping function that is provided in block 306 (FIG. 3) of the setup phase to perform the transformation.

A configuration repository reader 504 programmatically reads the content of the configuration repository 304 using the repository's API. A planning algorithm 506 provides a function that receives as input an initial state and a desired (goal) state both represented using the planner modeling language, and provides as output a plan which is a sequence of instantiated actions to reach the desired or goal state.

A controller 508 controls the execution of the optimizer 320. Upon a request for configuration change submitted by a user the controller will invoke other components to produce the output of the optimizer 320.

Figure 6:
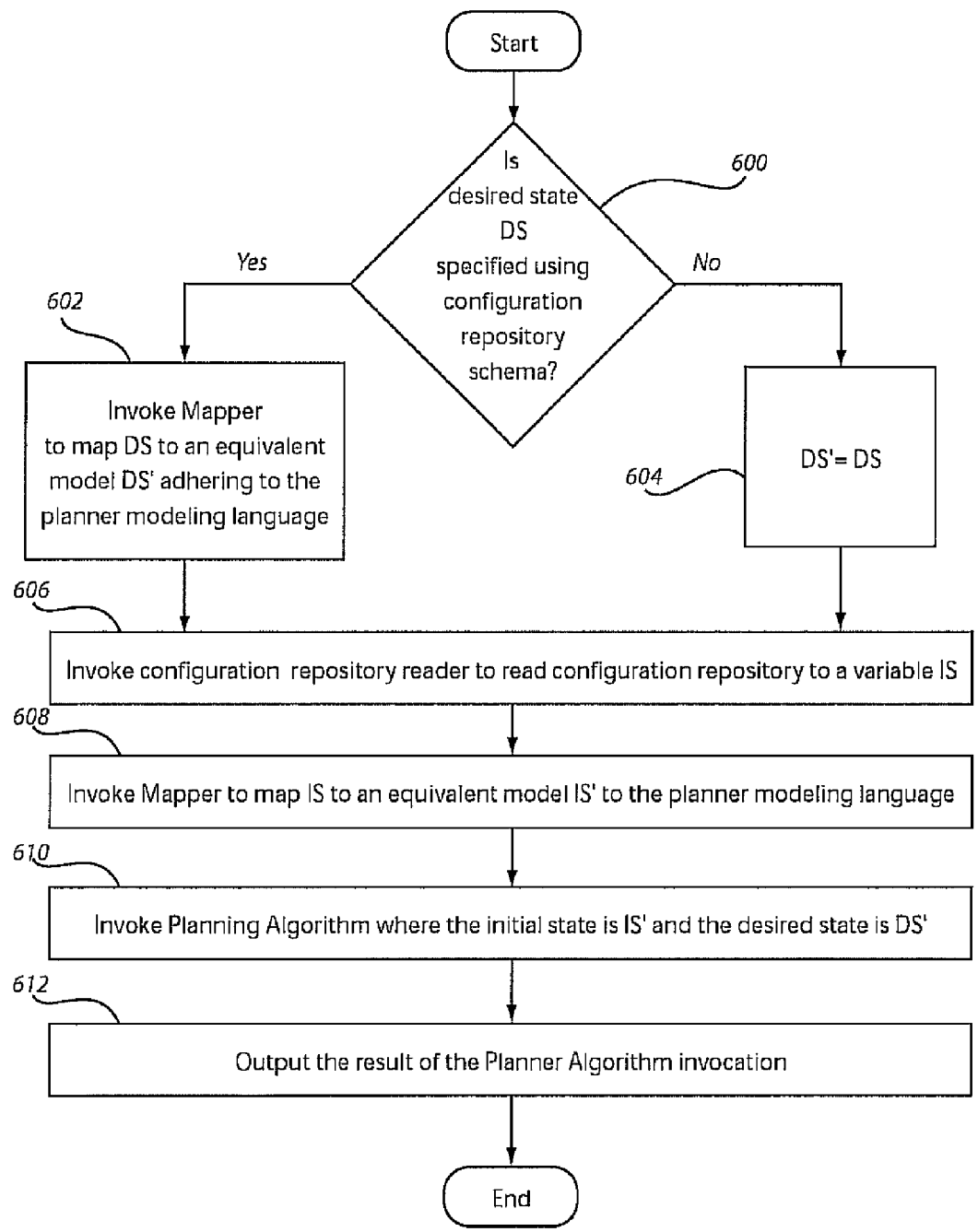
FIG. 6 is a flow diagram depicting an illustrative process for the provisioning optimizer to generate workflows for a desired managed resource configuration state.

Referring to FIG. 6, an illustrative method is shown for operation of the controller 508 (FIG. 5). The user of the system can specify a request for configuration change which includes a desired state. The user may specify the desired state using the configuration repository schema or the planner modeling language. The controller, upon receiving a new request for configuration change, checks what language is used in block 600. If the language that is used is the configuration repository schema the controller invokes the mapper 502 to transform the description to an equivalent description using the planner modeling language in block 602. It is known to those skilled in the art how to convert a desired state expressed using a different notation from the configuration repository schema or the planner modeling language into the planner modeling language.

Next, the controller invokes the configuration repository reader to read the content of the configuration repository specifying the current configuration state (initial state) of the set of managed resources in block 606. The controller invokes the mapper (502) to create an equivalent representation of the initial state using the planner modeling language in block 608.

Next, the controller invokes the planning algorithm (506) with the desired (goal) state and current state both specified in the planner modeling language in block 610. The controller then outputs the result provided by the planning algorithm which is a provisioning workflow in block 612.

Following are possible extensions to the basic principles of embodiments of the present invention.

Figure 7:
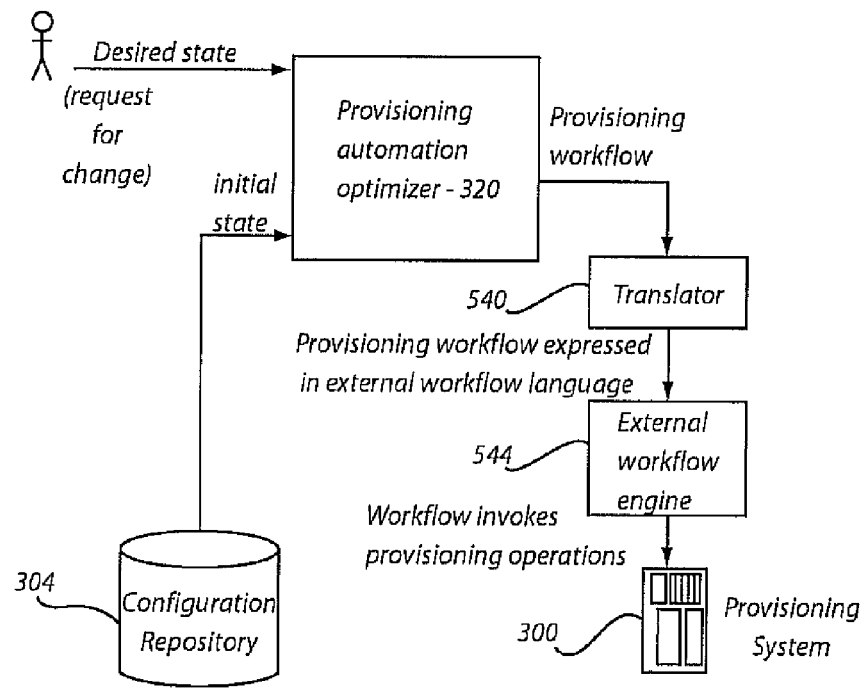
FIG. 7 is a block diagram showing a provisioning optimizer which generates workflows understood by a workflow engine external to the provisioning optimizer as translated by a translator in accordance with one embodiment.
Figure 8:
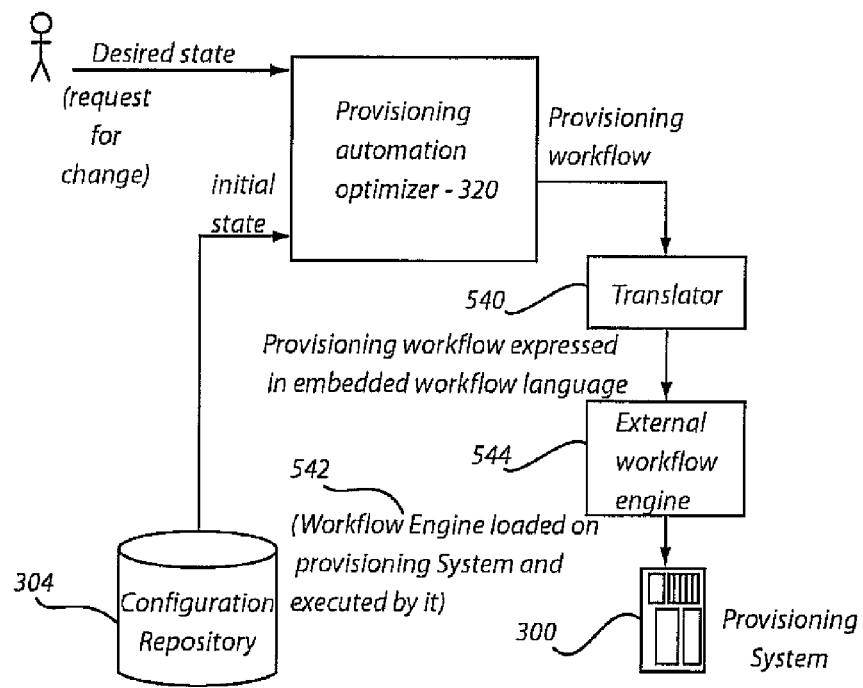
FIG. 8 is a block diagram showing a provisioning optimizer which generates workflows understood by a workflow engine internal (embedded) to the provisioning optimizer as translated by a translator in accordance with another embodiment.

Referring to FIGS. 7 and 8, the embodiment described above shows the output of the planning algorithm is produced as an output of the optimizer without further modifications.

However, an extension can introduce a translator component 540 that takes the output produced by the planning algorithm and produces a workflow in a specific workflow language. If the provisioning system 300 comes with its own embedded workflow engine 542 or an equivalent mechanism such as interpreter, the output of the planning algorithm can be translated to a format understood by this mechanism.

Another possibility is to use an external workflow engine 544. The translator 540 can translate the planning algorithm output to a format understood by the external workflow engine 544. The external workflow engine 544 can invoke the provisioning system operations from within the workflow execution. As there is a mapping between provisioning operations exposed by the provisioning system and the planner actions in the output of the provisioning algorithm it is straightforward to provide the translator 540 and make it work with the other components.

Parallelism in workflow may be exploited in accordance with one embodiment. The output of some planning algorithms is not a simple sequence of instantiated actions but a set of instantiated actions and a set of causal links. A causal link from instantiated action A to instantiated action B specifies that action A must be executed before action B. The set of causal links is assumed to be transitively closed. (If it is not, then the transitive closure can be easily calculated). If there are no causal links between two instantiated actions (after taking the transitive closure of this relationship) then it means that the two actions can be executed in any order or in parallel.

Figure 9:
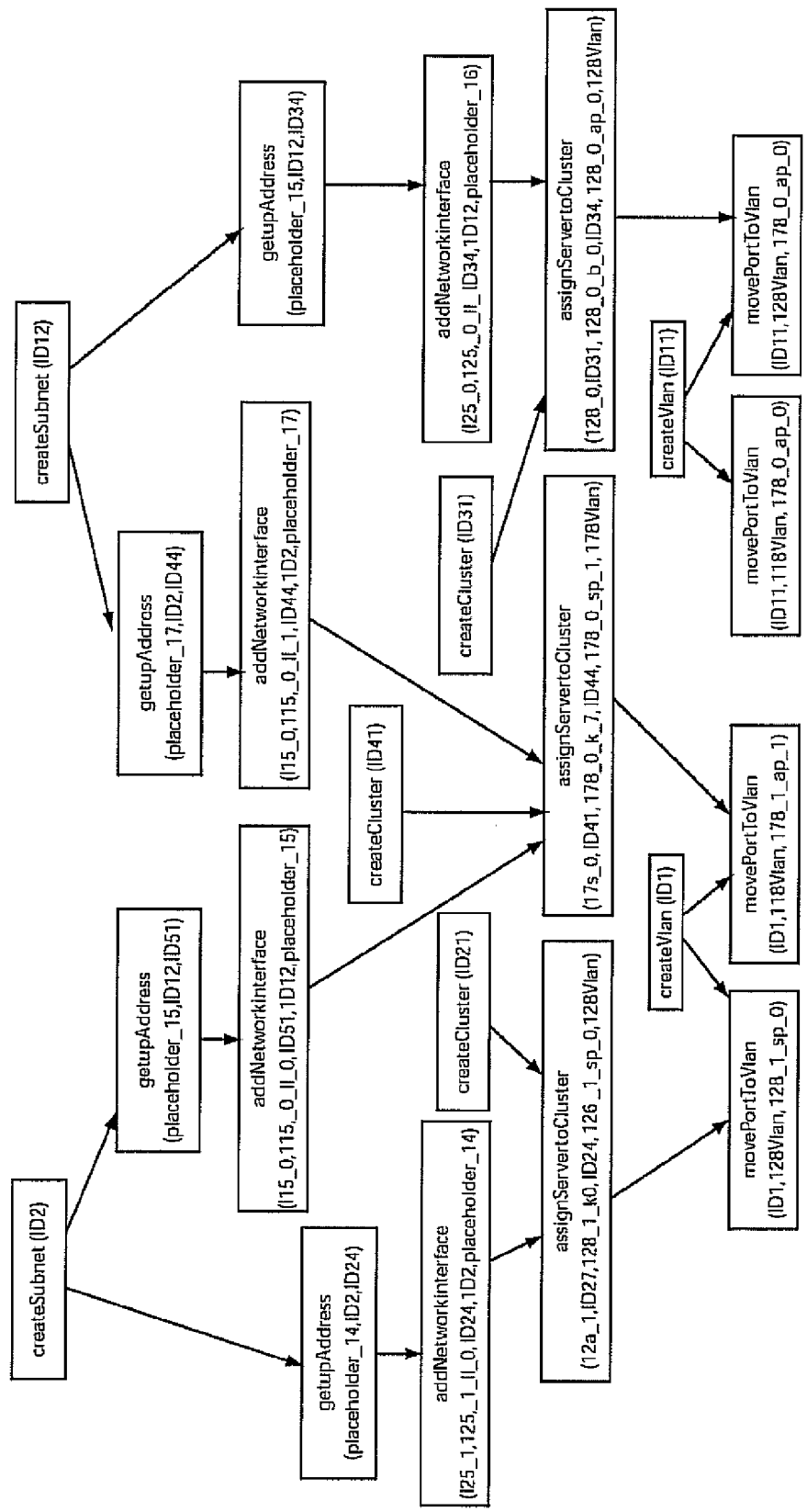
FIG. 9 is a block diagram showing workflow output from an optimizer including a set of provisioning actions and associated causal links between the provisioning actions.

Some workflow engines support parallel execution. Parallel execution expedites the completion of the workflow execution. If such a workflow engine technology is available the result of the optimizer (320) can be easily changed to be a set of actions and their associated causal links and not a particular sequence. The translator 540 can be used to produce a parallel workflow in a format understood by the workflow engine. FIG. 9 shows an example of an output of a planner that is in the format of a set of actions and an associated set of causal links (for clarity, without taking the transitive closure).

When exploiting parallelism in workflows, it may be necessary to augment the planning algorithm to take into account dependencies that stem from the fact that actions actually access and configure real resources. For example, if one action, Action A, installs a piece of software X on a machine Si, and another action Action B installs a different piece of software Y on the same machine Si, then if installing X is not a precondition to installing Y (or vice versa) the output produced by the planning algorithm may not include a causal link between these two operations. However, since these two operations access the same resource, they may not be able to be executed in parallel. To accommodate such dependencies, the following transformation can be preformed on the output of the planning algorithm (50).

Figure 10:
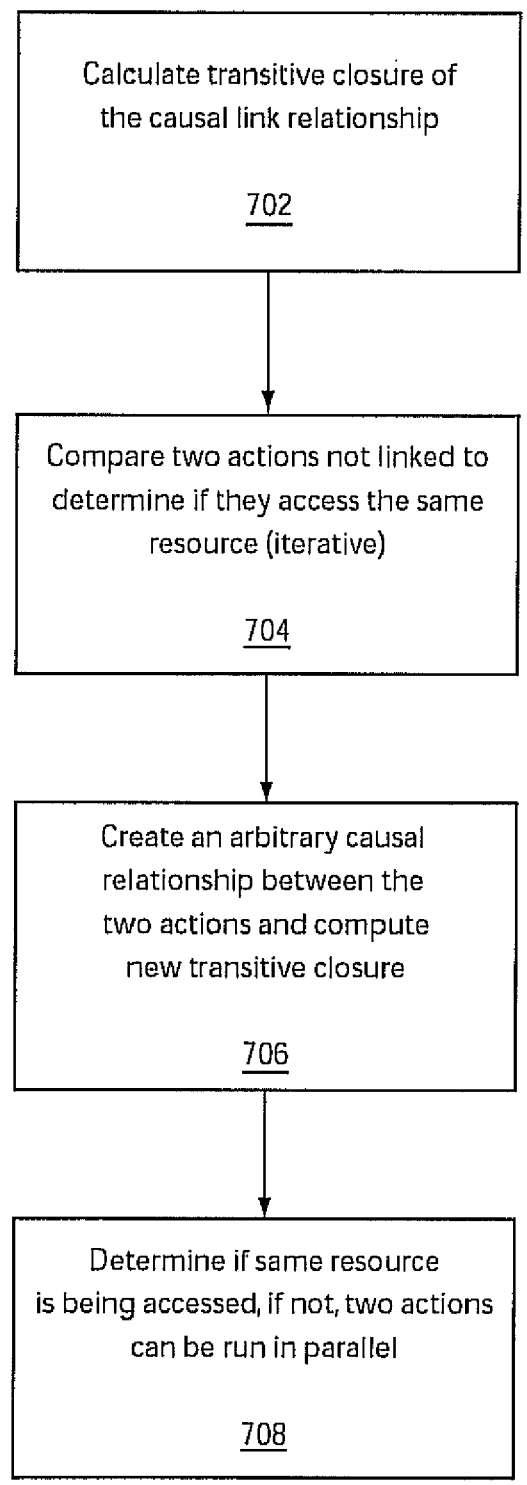
FIG. 10 is a flow diagram showing steps for determining if operations can be run in parallel.

Referring to FIG. 10, a method for determining if parallel actions may be taken in a workflow is illustratively shown. In block 702, calculate the transitive closure of the causal link relationship (if not calculated yet by the planning algorithm). In block 704, iteratively compare two actions that are not connected by a causal link, if the conjunction between the terms of the actions is not empty it means that they are accessing the same resource. In block 706, add a causal link in an arbitrary direction between the two actions and compute the new transitive closure. The result of this procedure will ensure that two actions do not access the same resource at the same time. The result is the new output of the optimizer in block 708. This method above can be optimized to increase the level of parallelism using various well known techniques.

For example, by taking into account different types of resource accesses (e.g., read vs. write) some actions can still be executed in parallel although they are accessing the same resource. Well-known scheduling algorithms can also be used to define the direction of the causal links that are added due to resource contingency. The direction of the new causal links can determine how fast the workflow execution completes. Scheduling algorithms can be used it the expected duration of execution of every action is known, in order to optimize the time for completion.

Referring again to FIG. 5, in some cases the desired configuration state of the system cannot be reached. This can happen if no action is available to make a particular change. For example, in many managed resource environments the wiring of the NICs to the switch ports is fixed. If in the initial state a NIC N1 is connected to a switch port SP1 (this may be expressed as: connect_NIC_SP (N1, SP1)) then a desired state that included a literal connect_NIC_SP(N1, SP2), where SP2≠SP1, cannot be reached. In this case, the optimizer 320 can be extended to output a failure notice or message instead of a workflow. In this manner, the present invention can be used to check if a particular desired state is reachable from an initial state. Further, the same approach may be used to explore if particular desired states are reachable from a hypothetical initial state. Such a hypothetical initial state can be created by simulating the configuration repository. This approach may be used, for example, to test future plans for plausibility.

Tooling 550 (FIG. 5), such as editing tools, that facilitate creation of models can be created to facilitate the creation of the request for configuration change. Such tooling 550 might visualize object relationship (or other) models and permits editing objects and relationships. The desired state can also be generated by an external system. Such external system that receives a high level request for change, and produces a detailed request for change may be provided.

The operation of the optimizer 320 can be further enhanced in many ways. One way is to invoke the configuration repository reader 504 and mapper 502 in parallel with invoking the mapper 502 on the input desired state. Another way is to keep a cached copy of the configuration repository 304 so it will not have to be read entirely for every new request for change. Many well-known caching techniques may be utilized.

In one embodiment, all resources are fully selected and specified in the request for configuration change (desired state). It may be possible to delay the selection of some resources until execution time in cases where planner actions do not depend on the identity of these resources. For example, selection of IP addresses and subnets can be delayed for execution time. The planner algorithm 506 may be augmented to deal with delayed resource selection. One possible way to do this is to use "place holders" for resources that are not yet selected.

A unique term can be defined for each unselected resource. Meta data can identify the terms that are used as place holders. These terms may be treated as any other term by the planning algorithm 506. In particular, the terms can appear as parameters in any instantiated action. The workflow that is produced by the planning algorithm 506 includes the place holder terms and meta data identifying them. The workflow can be easily transformed to be received as parameters at execution time the actual identity of resources and to substitute any place holder term with the corresponding resource identity.

The advantages of this approach include that the entire workflow or a part of the workflow can be reused and executed many times with different resource bindings. Well-known optimization techniques can be used to select appropriate sets of resources, minimizing or (maximizing) a given objective function, such as cost.

Costs 552 may be assigned to each operation and combinations of operations and ordering of operations can be analyzed by the planning algorithm 506 in terms of the costs 552.

In one embodiment, all of the provisioning operations are identified and ordered by the provisioning automation optimizer 320 before their execution by a provisioning system 300. It may be possible to iteratively identify operations (and their order) and execute the operations via a provisioning system 300. To do this, the planner identifies intermediate goal states. Plans are derived to achieve each goal state. After the generated operations are executed, the planning algorithm is executed with a new initial state (the state resulting from the execution of the partial plan). Such an iterative method might be used to handle the unexpected failure of provisioning operations.

In one embodiment, all of the provisioning operations of a provisioning system 300 are converted into planning actions in step 308 and are used by the planning algorithm 506 to identify provisioning operations and an order. However, it is possible to apply a restriction on the set of operations that are described as planning actions in step 308 or that are used by the planning algorithm 506. Such a restriction would limit the types of plans that would be generated by the planning algorithm 506. Such a restriction might be used, for example, when a user does not have authority to use all provisioning operations offered by the provisioning system 300.

Figure 11:
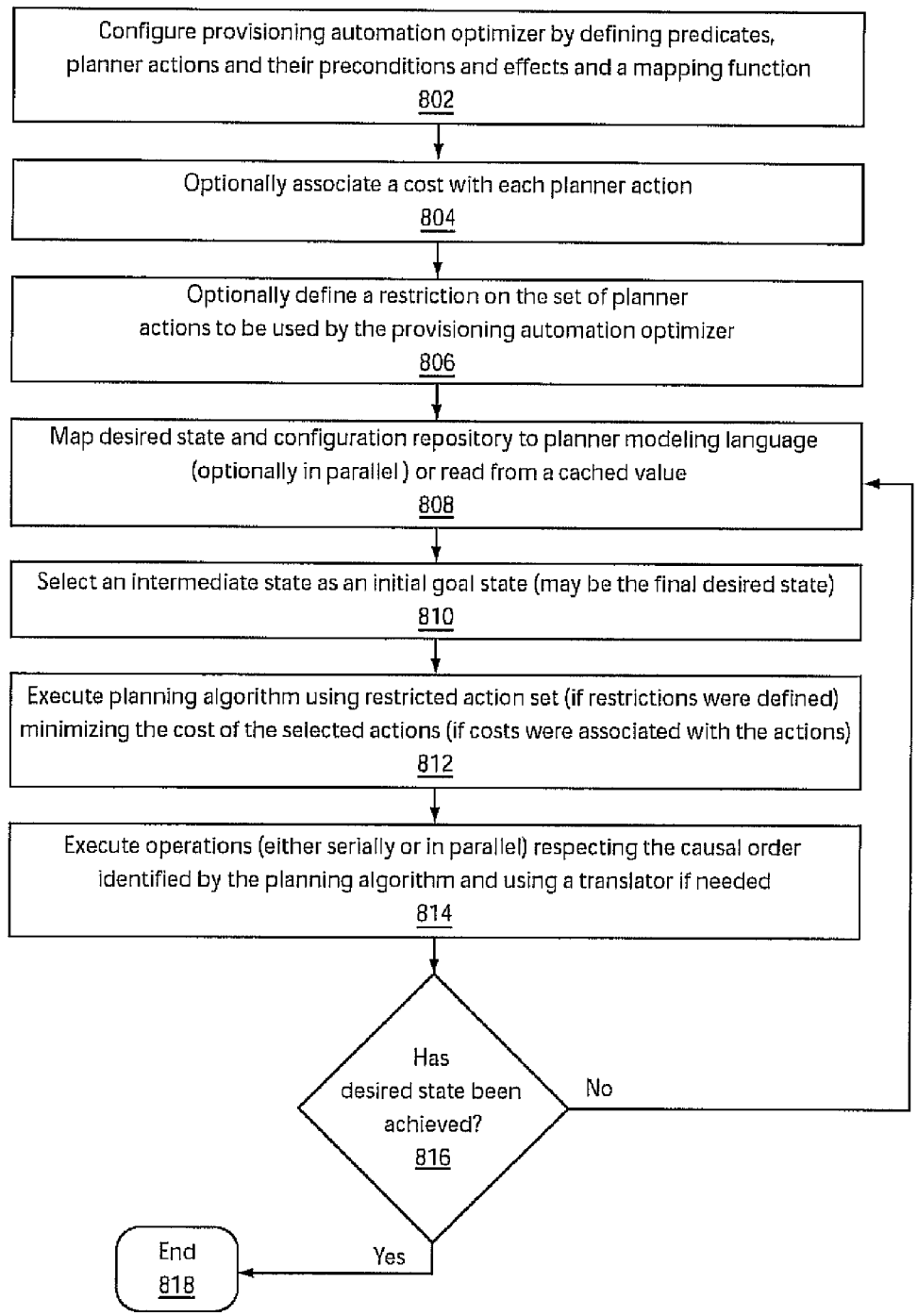
FIG. 11 is a block/flow diagram showing an illustrative system/method for ordering operation enhancements in accordance with embodiments of the present invention.

Referring to FIG. 11, a method for determining a set of provisioning operations and a valid order for their execution in a provisioning system that incorporates the enhancements described above is shown.

In block 802, the configuration mechanism of the provisioning automation optimizer is set up as described with reference to FIG. 3. This includes defining predicates, identifying planner actions corresponding to provisioning operations and defining their preconditions and effects, and defining a mapping function from the configuration repository modeling language to the planner modeling language.

In block 804, a cost 552 is optionally associated with each planning action.

In block 806, a restriction on the set of planning actions to be used by the planning algorithm 506 is defined. A restriction identifies a subset of all available planning actions.

In block 808, the desired configuration state and the current state, as defined in the configuration repository 304 are mapped to the planner modeling language. This may be done in parallel. If the states have previously been mapped and the result cached, this step may read use the cached value.

In block 810, a goal state is identified. This goal state may be the final desired goal state. If the goal state is the final desired goal state, only one iteration of planning is needed. Otherwise this goal state may be any expected intermediate state between the current state and the desired configuration state. This intermediate state can be selected in any manner.

In block 812, the planning algorithm 506 is executed to identify a set of actions and their order which, if executed, will change the initial state into the goal state. The planning algorithm will consider only operations in the restricted set of operations if any were defined in step 806. Further, the planning algorithm will optimize the cost (for example, by minimizing it) of the operations selected if a cost 552 was associated with each action in step 804.

In block 814, the identified operations are executed, in an order that respects the causal order identified by the planning algorithm, to change the state of the managed resources. These operations use a translator as in FIG. 7 or FIG. 8.

Further, the operations may be executed either serially or in parallel using a method such as that described in FIG. 10 to determine a valid parallel order.

In block 816, determine if the intermediate goal state selected was the final desired state. If so, the planning algorithm ends at block 818. Otherwise, the method is repeated starting at block 808.

Having described preferred embodiments of method, system, and computer program product are disclosed for automatically determining a valid ordering of provisioning operations, and their needed parameters (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for ordering operations to achieve a desired state of the resources managed by a provisioning system, comprising the steps of:
identifying provisioning operations for a provisioning system;
defining preconditions and effects of the provisioning operations;
mapping a current state of resources and a desired future state of resources into a form suitable for a planning algorithm, wherein the planning algorithm assigns costs to operations to decide a valid workflow order; and
applying the planning algorithm to automatically generate provisioning workflows for the provisioning system.

2. The method as recited in claim 1, wherein applying includes ordering provisioning operations to determine the valid workflow order for the provisioning system to configure the current state of resources to implement a service or application.

3. The method according to claim 2, further comprising the step of selecting an execution order consistent with an identified valid workflow order.

4. The method according to claim 2, further comprising the step of executing the provisioning operations in an order consistent with the valid workflow order.

5. The method according to claim 4, wherein the executing of the provisioning operations is performed serially.

6. The method according to claim 4, wherein the executing of the provisioning operations is performed in parallel.

7. The method according to claim 6, further comprising the step of alternating the steps of identifying the provisioning operations and executing the provisioning operations until a desired goal is obtained.

8. The method according to claim 1, wherein the costs are used to optimize the selection of a valid set of provisioning operations and the order.

9. The method according to claim 1, wherein the identifying provisioning operations is restricted to identify a subset of the provisioning operations to achieve a desired goal.

10. A computer program product comprising a non transitory computer readable medium including a computer readable program for ordering operations, wherein the computer readable program when executed on a computer causes the computer to perform the steps of:
identifying provisioning operations to achieve a desired state of the resources managed by a provisioning system;

defining preconditions and effects of the provisioning operations;

mapping a current state of resources and a desired future state of resources into a form suitable for a planning algorithm, wherein the planning algorithm assigns costs to operations to decide a valid workflow order; and applying the planning algorithm to automatically generate provisioning workflows for the provisioning system.

11. A method for determining a set of provisioning operations and a valid order for their execution in a provisioning system, comprising the steps of:

storing configuration criteria and a mapping function in a configuration mechanism;

mapping content from a configuration repository and a desired future state of resources into a form suitable for a planning algorithm by employing the mapping function, wherein content includes information about a current state of resources managed by the provisioning system; and determining a workflow by employing the planning algorithm which receives as input the current state of resources and the desired future state of resources and plans a set of provisioning operations to automatically generate provisioning workflows for the provisioning system to achieve the desired future state in accordance with the configuration criteria, wherein the planning algorithm assigns costs to operations to decide a valid workflow order.

12. The method as recited in claim 11, wherein determining includes ordering the provisioning operations to determine the valid workflow order for the provisioning system to configure the current state of resources to implement a service or application.

13. The method according to claim 12, further comprising the step of executing the provisioning operations in an order consistent with the valid workflow order.

14. The method according to claim 13, wherein the executing of the provisioning operations is performed serially.

15. The method according to claim 13, wherein the executing of the provisioning operations is performed in parallel.

16. The method according to claim 13, further comprising the step of alternating a step of identifying the provisioning operations in the workflow and executing the operations until the goal state is achieved.

17. The method according to claim 11, wherein the costs are used to optimize the selection of a valid set of provisioning operations and the order.

18. The method according to claim 11, wherein the provisioning operations selected for the workflow are restricted to a subset of provisioning operations.

19. A computer program product comprising a non transitory computer readable medium including a computer readable program for determining a set of provisioning operations and a valid order for their execution in a provisioning system, wherein the computer readable program when executed on a computer causes the computer to perform the steps of:

storing configuration criteria and a mapping function in a configuration mechanism;

mapping content from a configuration repository and a desired future state of resources into a form suitable for a planning algorithm by employing the mapping function, wherein content includes information about a current state of resources managed by the provisioning system; and determining a workflow by employing the planning algorithm which receives as input the current state of resources and the desired future state of resources and plans a set of provisioning operations to automatically generate provisioning workflows for the provisioning system to achieve the desired future state in accordance with the configuration criteria, wherein the planning algorithm assigns costs to operations to decide a valid workflow order.

20. A system for determining a set of provisioning operations and a valid order for their execution in a provisioning system, comprising:

a configuration mechanism which stores configuration criteria and a mapping function;

a mapper which employs the mapping function to map content from a configuration repository and a desired future state of resources into a form suitable for a planning algorithm, wherein content includes information about a current state of resources managed by the provisioning system; and the planning algorithm receives information on the current state of resources and the desired future state of resources and plans a set of provisioning operations to automatically generate provisioning workflows for the provisioning system to achieve the desired future state in accordance with the configuration criteria and outputs the workflow, wherein the planning algorithm includes a cost module which assigns costs to operations to decide a valid workflow order.

21. The system as recited in claim 20, wherein the configuration criteria includes definitions for predicates, actions, preconditions and effects for operations to be ordered and selected.

22. The system as recited in claim 20, wherein the configuration repository includes a model schema which describes the current state of resources managed by the provisioning system.

23. The system as recited in claim 20, wherein the mapping function transforms the content of the configuration repository to a domain state expressed over a set of predicates.

24. The system as recited in claim 20, further comprising a controller which controls and manages components of the system.

25. The system as recited in claim 20, further comprising a repository reader which reads the content from the configuration repository for the mapper.

26. The system as recited in claim 20, wherein the planning algorithm includes a domain definition based on the configuration criteria and determines the current states of resources to be managed needed to achieve the goal state.

27. The system as recited in claim 20, wherein the workflow includes a failure notice when the goal state can not be achieved.

28. The system as recited in claim 20, further comprising editing tools employed to change resource configurations.

29. The system as recited in claim 20, wherein the goal state is input by a user.

30. The system as recited in claim 20, further comprising a translator which translates the workflow from a planning modeler language to a language suitable for execution by the provisioning system.

* * * * *